(12) United States Patent
Lee

(10) Patent No.: US 10,347,211 B2
(45) Date of Patent: Jul. 9, 2019

(54) DISPLAY DRIVER INTEGRATED CIRCUIT AND DISPLAY DRIVING SYSTEM INCLUDING THE SAME

(71) Applicant: Samsung Electronics Co., Ltd., Suwon-si (KR)

(72) Inventor: Sang-Min Lee, Hwaseong-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/720,212

(22) Filed: Sep. 29, 2017

(65) Prior Publication Data

US 2018/0122296 A1 May 3, 2018

(30) Foreign Application Priority Data

Nov. 1, 2016 (KR) .................. 10-2016-0144665

(51) Int. Cl.
| G09G 3/22 | (2006.01) |
| G09G 5/10 | (2006.01) |
| H04N 9/64 | (2006.01) |
| G09G 5/02 | (2006.01) |
| G09G 5/06 | (2006.01) |
| G09G 3/20 | (2006.01) |

(52) U.S. Cl.
CPC .......... *G09G 5/026* (2013.01); *G09G 3/2092* (2013.01); *G09G 3/22* (2013.01); *G09G 5/06* (2013.01); *G09G 5/10* (2013.01); *G09G 2320/0673* (2013.01); *G09G 2330/021* (2013.01); *G09G 2360/14* (2013.01); *G09G 2360/144* (2013.01); *G09G 2360/16* (2013.01); *G09G 2370/16* (2013.01)

(58) Field of Classification Search
CPC ......... G09G 3/3208; G09G 2320/0233; G09G 2320/0626; G09G 2320/0646; G09G 2320/0686; G09G 2330/021
See application file for complete search history.

(56) References Cited

U.S. PATENT DOCUMENTS

| 8,164,598 | B2 | 4/2012 | Kimpe |
| 8,730,271 | B2 | 5/2014 | Kim |
| 8,970,642 | B2 | 3/2015 | An et al. |
| 9,236,017 | B2 | 1/2016 | Park |
| 9,332,239 | B2 | 5/2016 | Cote et al. |
| 2007/0040774 | A1* | 2/2007 | Lee ............... G09G 3/3233 345/77 |
| 2013/0222221 | A1* | 8/2013 | An ................ G09G 3/3426 345/102 |
| 2015/0243223 | A1* | 8/2015 | Koh ............... G09G 3/3406 345/690 |

(Continued)

*Primary Examiner* — Dong Hui Liang
(74) *Attorney, Agent, or Firm* — Muir Patent Law, PLLC

(57) ABSTRACT

A display driving system includes a display driver integrated circuit, and the display driver integrated circuit includes a brightness calculating circuit, an image complexity calculating circuit, a weight calculating circuit and a look up table. The brightness calculating circuit calculates brightness of image data and generates brightness data. The image complexity calculating circuit calculates image complexity and generates weight data, based on a pattern of the image data. The weight calculating circuit receives brightness data and a weight data to generate brightness correction data.

17 Claims, 7 Drawing Sheets

(56) References Cited

U.S. PATENT DOCUMENTS

2015/0373319 A1 12/2015 Kinoshita et al.
2016/0156932 A1 6/2016 Lee et al.
2016/0180782 A1 6/2016 Nakaya

* cited by examiner

DISPLAY DRIVER INTEGRATED CIRCUIT AND DISPLAY DRIVING SYSTEM INCLUDING THE SAME

CROSS-REFERENCE TO RELATED APPLICATIONS

A claim for priority under 35 U.S.C. § 119 is made to Korean Patent Application No. 10-2016-0144665 filed Nov. 1, 2016, in the Korean Intellectual Property Office, the entire contents of which are hereby incorporated by reference.

BACKGROUND

Embodiments of the present disclosure described herein relate to image processing of a display device, and more particularly, relate to a display driver integrated circuit and a display driving system including the same.

In general, many electronic devices include display panels which may display images. The display panels may be implemented in various forms such as organic light-emitting diode (OLED) panels, active matrix organic light-emitting diode (AMOLED) panels, liquid crystal display (LCD) panels, electrophoretic display panels, electrowetting display panels, and plasma display panels (PDP). To drive display devices having the above display panels, display driver integrated circuits (ICs) are provided to the display devices and are supplied with power.

Recently, there are increased demands for miniaturized and portable display driving system such as a smartphone, a tablet personal computer (PC), or a wearable device including a smart watch. In such display driving system, the display driver ICs are supplied with power by using batteries. However, due to the limitation in the capacities of the batteries and the limitation in the physical size of the batteries resulting from the miniaturization, reducing power consumption in the stage of driving the display driver IC has become important. Thus, there is a need for display driving systems which prevent users from recognizing the degradation in image quality and display images with lower power consumption.

SUMMARY

Embodiments of the present disclosure provide a display driver integrated circuit, which displays an image with lower power consumption, and a display driving system including the same.

According to one aspect of an exemplary embodiment, a display driver integrated circuit may include: a brightness calculating circuit configured to calculate brightness of image data and to generate brightness data; an image complexity calculating circuit configured to calculate image complexity based on a pattern of the image data and to generate weight data based on the image complexity; a weight calculating circuit configured to receive the brightness data and the weight data and to generate brightness correction data based on the brightness data and the weight data; and a source integrated circuit configured to generate a data voltage corresponding to the image data, based on the brightness correction data, wherein the source integrated circuit decreases the data voltage as the image complexity increases.

According to another aspect of an exemplary embodiment, a display driving system may include: a display driver integrated circuit configured to generate a data voltage based on image data which comprises target pixel data of a target pixel and edge pixel data of an edge pixel adjacent to the target pixel data; and a display panel comprising a data line, which receives the data voltage, a gate line which crosses the data line, and a pixel connected with the data line and the gate line, wherein the display driver integrated circuit comprises: control circuit configured to calculate image complexity based on a difference in data value between the target pixel data and the edge pixel data; and a source integrated circuit configured to generate the data voltage corresponding to the target pixel data based on the image complexity, and wherein the source integrated circuit reduces the data voltage as the image complexity increases.

According to yet another aspect of an exemplary embodiment, a display driving method may include: calculating brightness of image data and generating brightness data; calculating image complexity of the image data based on a pattern of the image data and generating weight data based on the image complexity; receiving the brightness data and the weight data; generating brightness correction data based on the received brightness data and the weight data; generating a data voltage corresponding to the image data based on the brightness correction data; and decreasing the data voltage as the image complexity increases.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
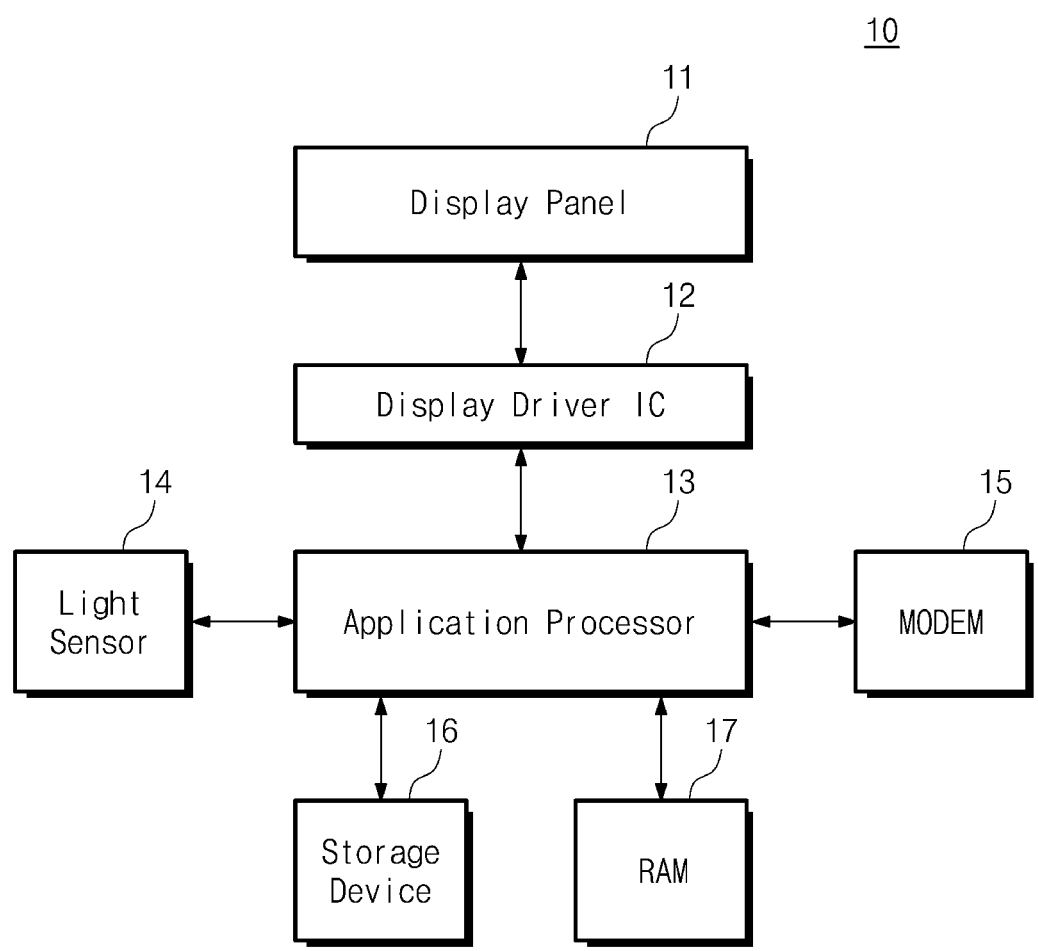
FIG. 1 is a block diagram illustrating a display driving system, according to an exemplary embodiment.

The present disclosure now will be described more fully hereinafter with reference to the accompanying drawings, in which various embodiments are shown. The invention may, however, be embodied in many different forms and should not be construed as limited to the example embodiments set forth herein. These example embodiments are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

Although the figures described herein may be referred to using language such as "one embodiment," or "certain embodiments," these figures, and their corresponding descriptions are not intended to be mutually exclusive from other figures or descriptions, unless the context so indicates. Therefore, certain aspects from certain figures may be the same as certain features in other figures, and/or certain figures may be different representations or different portions of a particular exemplary embodiment.

As used herein, and unless indicated otherwise, items described as being "electrically connected" are configured such that an electrical signal can be passed from one item to the other. Therefore, a passive electrically conductive component (e.g., a wire, pad, internal electrical line, etc.) physically connected to a passive electrically insulative component (e.g., a prepreg layer of a printed circuit board, an electrically insulative adhesive connecting two devices, an electrically insulative underfill or mold layer, etc.) that does not permit electric current to pass therethrough is not electrically connected to that component. Moreover, items that are "directly electrically connected," to each other are electrically connected through one or more passive elements, such as, for example, wires, pads, internal electrical lines, through vias, etc. As such, directly electrically connected components do not include components electrically connected through active elements, such as transistors or diodes. Directly electrically connected elements may be directly physically connected and directly electrically connected.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a block diagram illustrating a display driving system 10, according to an exemplary embodiment. For example, the display driving system 10 may include at least one of a smartphone, a smart pad, a smart television, and a wearable device such as a smart watch.

Referring to FIG. 1, the display driving system 10 includes a display panel 11, a display driver integrated circuit (IC) 12, an application processor 13 (e.g., an application processing circuitry), a light sensor 14, a modulator and demodulator (MODEM) 15, a storage device 16, and a random access memory (RAM) 17.

The display panel 11 displays an image. The display driver IC 12 is configured to supply a voltage to the display panel 11 and the display panel 11 is configured to receive the voltage, which is used to display the image. The display driver IC 12 receives image data and an image control signal from the application processor 13 for displaying the image. The display driver IC 12 may function as a controller which is to drive the display panel 11.

The application processor 13 may perform a control operation for the control of the display driving system 10, and various operations for various data. The application processor 13 may execute an operating system and various applications. For example, the application processor 13 may provide a low-power mode command to the display driver IC 12 and thus may control the display driver IC 12 to operate in the low-power mode. The display driver IC 12 may adjust a data voltage and thus reduces the brightness of an image displayed by the display panel 11.

The light sensor 14 may include a color sensor, which senses light in a visible band, and an infrared sensor which senses light in an infrared band. The light sensor 14 may sense light from the outside and may provide a light sense signal to the application processor 13. The application processor 13 may calculate an illuminance value based on the light sense signal and may provide illuminance information to the display driver IC 12. In addition, the light sensor 14 includes an illuminance sensor which calculates an external illuminance value and provides the light sense signal including the illuminance information to the application processor 13. The display driver IC 12 may adjust the brightness of the image displayed by the display panel 11, based on the illuminance information. For example, the display driver IC 12 may adjust a brightness value of the image to a relatively high value under a bright environment having a high illuminance value (e.g., an illuminance value of about 500 lux to about 10000 lux or more than 10000 lux). The display driver IC 12 may adjust the brightness value of the image to a relatively lower value under a dark environment having a low illuminance value (e.g., an illuminance value of about 40 lux to about 300 lux or less than 40 lux).

The MODEM 15 may communicate with an external device. The MODEM 15 may make communication based on at least one of various wireless communication schemes, such as long term evolution (LTE), code division multiple access (CDMA), Bluetooth, near field communication (NFC), Wi-Fi, and radio frequency identification (RFID), and various wired communication schemes such as universal serial bus (USB), serial at attachment (SATA), serial peripheral interface (SPI), inter-integrated circuit (I2C), HS-I2C, and integrated-interchip sound (I2S).

The storage device 16 may be used as an auxiliary memory device of the application processor 13. For example, the storage device 16 may store source codes of the operating system or various applications executed by the application processor 13 and various pieces of data, which are created by the operating system or the applications, for long-term storage. The storage device 16 may include a flash memory, a phase-change RAM (PRAM), a magnetic RAM (MRAM), ferroelectric RAM (FeRAM), and a resistive RAM (RRAM).

The RAM 17 may be used as a main memory device of the application processor 13. For example, the RAM 17 may store various pieces of data and codes processed by the application processor 13. The RAM 17 may include a dynamic RAM (DRAM), a static RAM (SRAM), a phase-change RAM (PRAM), a magnetic RAM (MRAM), a ferroelectric RAM (FeRAM), and a resistive RAM (RRAM).

Figure 2:
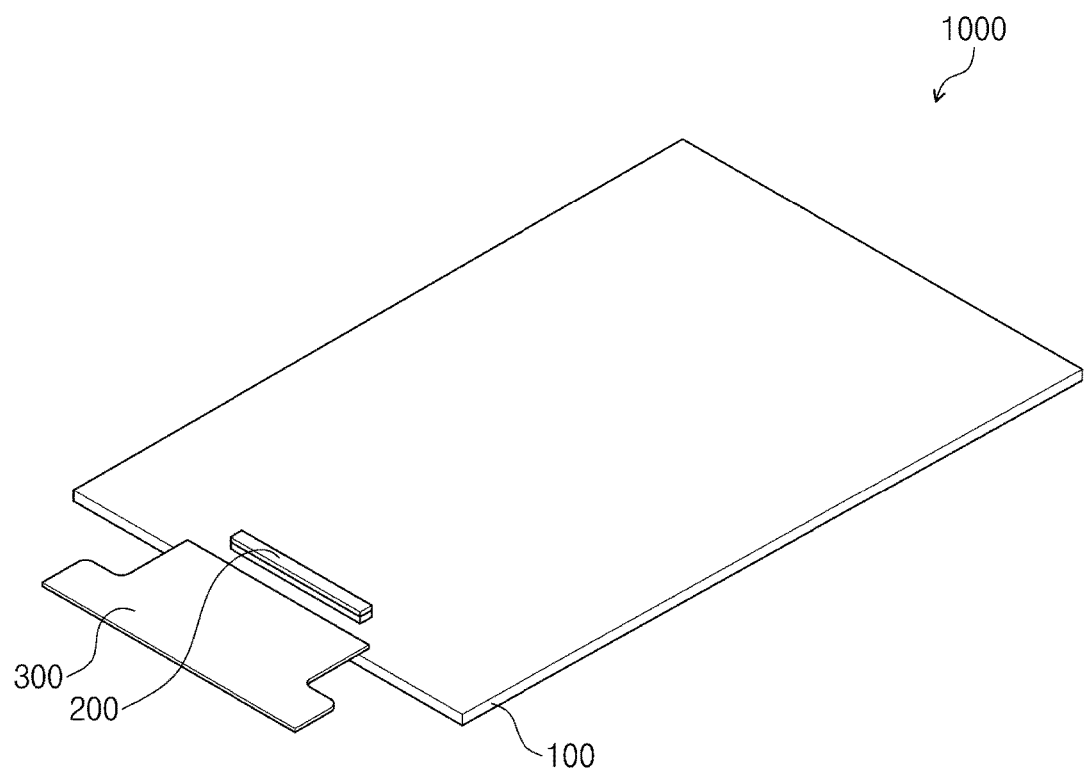
FIG. 2 is a perspective view illustrating a display driving system, according to an exemplary embodiment.

FIG. 2 is a perspective view illustrating a display driving system 1000, according to an exemplary embodiment.

Referring to FIG. 2, the display driving system 1000 may include a display panel 100, a display driver IC 200, and a flexible printed circuit board 300. In some embodiments, the display panel 100 of FIG. 2 may have the same structure as the display panel 11 of FIG. 1 and the display driver IC 200 of FIG. 2 may have the same structure as the display driver IC 12 of FIG. 1.

The display panel 100 displays an image. The display panel 100 may be any one of various display panels. For example, the display panel 100 may be any one of a liquid crystal display (LCD) panel, an organic light emitting display (OLED) panel, an electrophoretic display panel, and an electrowetting display panel.

The display driver IC 200 may be mounted on the display panel 100. However, the embodiment is not limited thereto. For example, the display driver IC 200 may be mounted on the flexible printed circuit board 300. The display driver IC 200 receives image data and a control signal for driving the display panel 100 and supplies a gate voltage and a data voltage to the display panel 100, which will be described later.

In this exemplary embodiment, the flexible printed circuit board 300 is attached to the display panel 100. The flexible printed circuit board 300 may be connected (e.g., electrically connected) with an external system, such as the application processor 13 of FIG. 1, and a power supply (not shown). The flexible printed circuit board 300 provides image data, a control signal, and power to the display panel 100 and the display driver IC 200.

Figure 3:
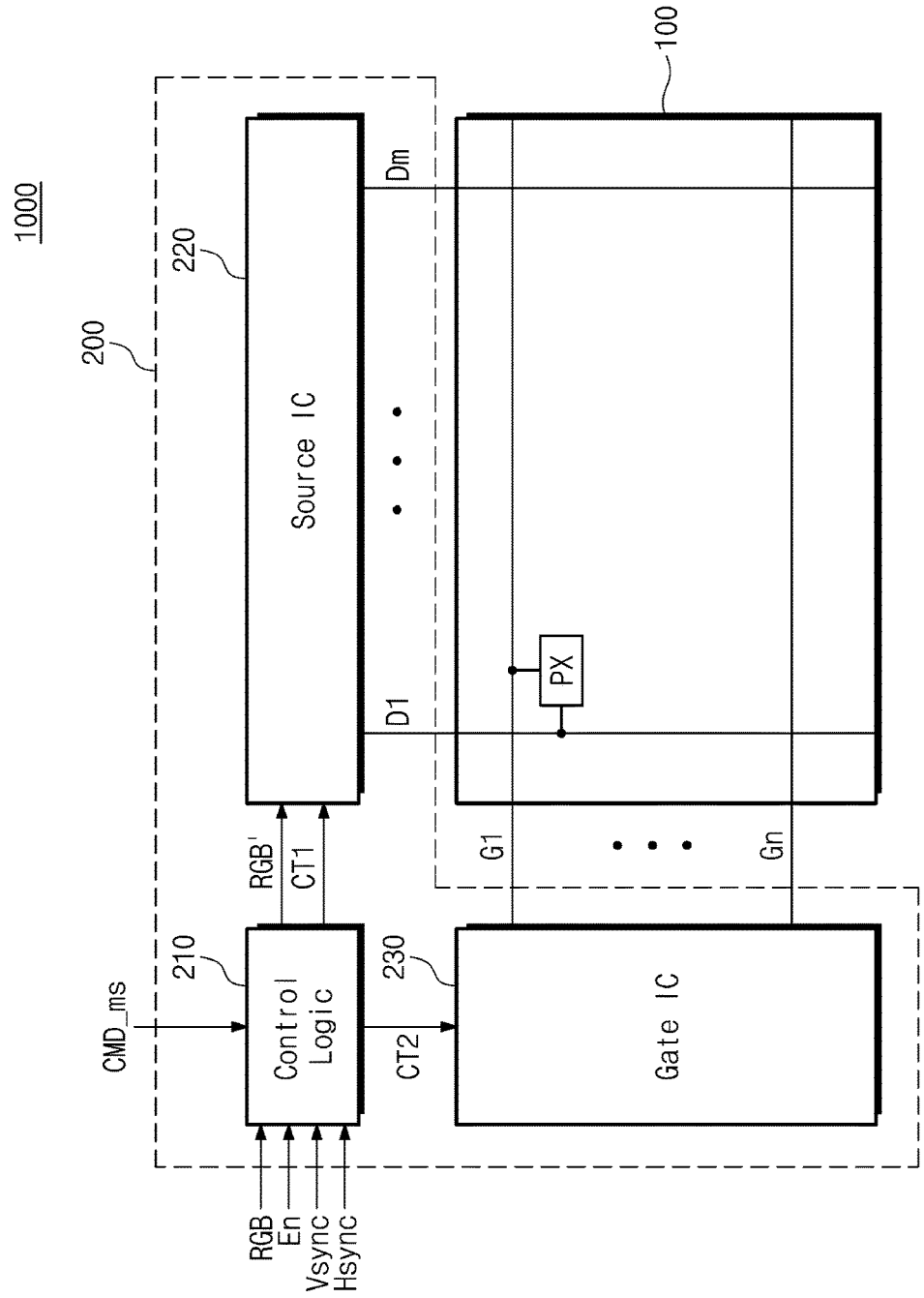
FIG. 3 is a block diagram illustrating a display panel and a display driver integrated circuit, according to an exemplary embodiment.

FIG. 3 is a block diagram illustrating the display panel 100 and the display driver IC 200 of the display driving system 1000, according to an exemplary embodiment.

The display panel 100 includes gate lines G1 to Gn, data lines D1 to Dm, and pixels PX. The gate lines G1 to Gn receive the gate voltage from the display driver IC 200. The data lines D1 to Dm receive the data voltage from the display driver IC 200. The gate lines G1 to Gn are insulated from the data lines D1 to Dm, and the gate lines G1 to Gn cross the data lines D1 to Dm. Each of the pixels PX may be connected with any one of the gate lines G1 to Gn and any one of the data lines D1 to Dm.

The display driver IC 200 includes control logic 210 (e.g., a control circuitry), a source IC 220, and a gate IC 230.

The control logic 210 receives image data RGB and a control signal from the application processor 13 of FIG. 1. The control signal may include a vertical synchronization (sync) signal Vsync, which is a signal for frame identification, a horizontal synchronization (sync) signal Hsync, which is a signal for row identification, and a data enable signal En having a relatively high level for a data output duration such that a section, in which data is input, is output. In addition, the control logic 210 may receive a low-power mode command CMD_ms (e.g., a low-power mode signal) from the application processor 13. The display driver IC 200 may operate in a low-power mode.

The control logic 210 outputs a first control signal CT1, a second control signal CT2, and corrected image data RGB'. The first control signal CT1 is a signal for controlling the operation of the source IC 220. The first control signal CT1 may include a horizontal start signal for starting the operation of the source IC 220 and an output indication signal for determining a timing in which the data voltage is output from the source IC 220. The second control signal CT2 is a signal for controlling the operation of the gate IC 230. The second control signal CT2 may include a gate clock and a vertical start signal.

The control logic 210 generates the corrected image data RGB' and outputs the corrected image data RGB' to the source IC 220. The control logic 210 generates the corrected image data RGB' by correcting the brightness of the image data RGB which will be discussed later with reference to FIGS. 4-9. The image data RGB and the corrected image data RGB' include information on the brightness of the pixels PX. When the control logic 210 receives the low-power mode command CMD_ms from the application processor 13 of FIG. 1, the control logic 210 may generate the corrected image data RGB' based on the image data RGB. The details of the generation of the corrected image data RGB' will be described later.

The source IC 220 outputs the data voltage to the data lines D1 to Dm based on the first control signal CT1 and the corrected image data RGB'. The source IC 220 may convert the corrected image data RGB' into the data voltage through a digital-analog conversion operation.

The gate IC 230 provides gate signals to the gate lines G1 to Gn in response to the second control signal CT2. The gate IC 230 generates the gate signals to drive the gate lines G1 to Gn in response to the second control signal CT2, and sequentially outputs the gate signals to the gate lines G1 to Gn.

Although the above description has been made in that the control logic 210, the source IC 220, and the gate IC 230 are divided into individual blocks as illustrated in FIG. 3, the control logic 210, the source IC 220, and the gate IC 230 may be integrated. For example, the control logic 210, the source IC 220, and the gate IC 230 may be mounted on the display panel 100 in the form of one chip like the display driver IC 200 of FIG. 2, thereby ensuring the portability, the miniaturization, and the slimness of an electronic device.

Figure 4:
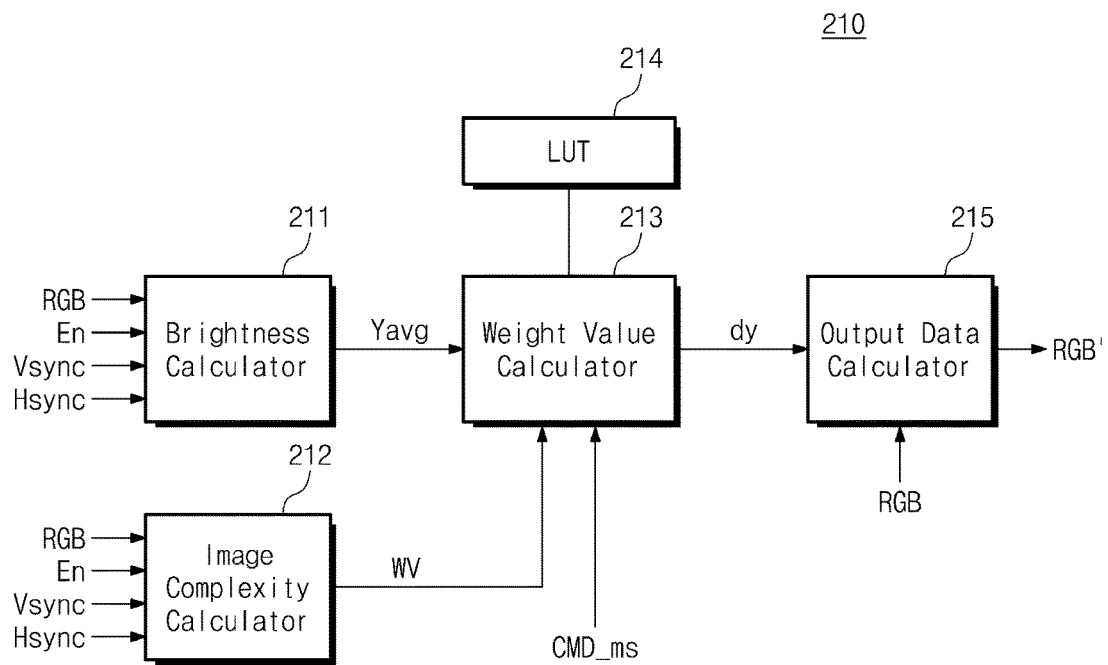
FIG. 4 is a block diagram illustrating control logic, according to an exemplary embodiment.

FIG. 4 is a block diagram illustrating the control logic 210, according to an exemplary embodiment.

Referring to FIGS. 3 and 4, the control logic 210 includes a brightness calculator 211 (e.g., a brightness calculating circuit), an image complexity calculator 212 (e.g., an image complexity calculating circuit), a weight calculator 213 (e.g., a weight calculating circuit), a look-up table (LUT) 214, and an output data calculator 215 (e.g., an output data calculating circuit). These various modules/circuits may include hardware, software, and/or firmware that perform various functions.

The brightness calculator 211 calculates a brightness value of the image data RGB corresponding to each pixel PX of the display panel 100. The brightness calculator 211 may receive the image data RGB, the data enable signal En, the vertical sync signal Vsync, and the horizontal sync signal Hsync from the application processor 13 of FIG. 1. The brightness calculator 211 outputs brightness data Yavg based on the image data RGB, the data enable signal En, the vertical sync signal Vsync, and the horizontal sync signal Hsync.

Figure 6:
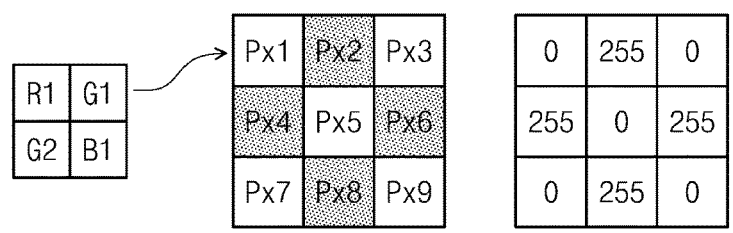
FIGS. 6 and 7 are drawings illustrating detection of edge pixel data of the image complexity calculator of FIG. 4.
Figure 6:
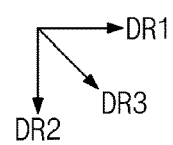
Figure 7:
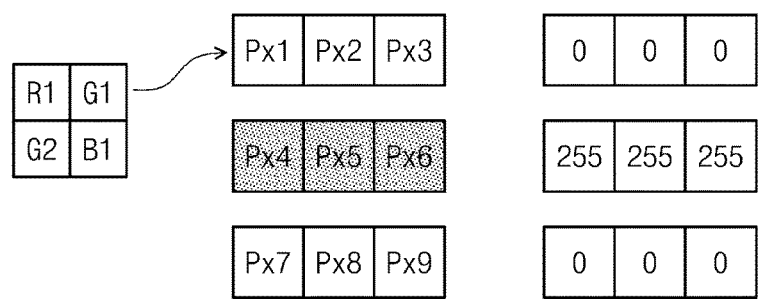
Figure 7:
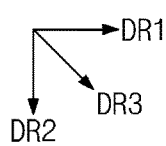

Each of the pixels PX may include a plurality of color pixels. For example, each pixel PX may include a red pixel, a first green pixel, a second green pixel, and a blue pixel (see, e.g., a red pixel R1, a first green pixel G1, a second green pixel G2, and a blue pixel B1 as illustrated in FIGS. 6 and 7). The image data RGB may have data values corresponding to the color pixels. The color of an image represented by each pixel PX may be determined through a combination of the data values corresponding to the color pixels. The brightness data Yavg of each pixel PX may correspond to a mean value of the data values corresponding to the color pixels. For example, the brightness calculator 211 may extract image data RGB corresponding to the color pixels in the unit of a pixel and may output the brightness data Yavg as the mean value of the data values corresponding to the color pixels.

The image complexity calculator 212 calculates image complexity by analyzing the pattern of the image data RGB. The image complexity calculator 212 may receive the image data RGB, the data enable signal En, the vertical sync signal Vsync, and the horizontal sync signal Hsync from the application processor 13 of FIG. 1. The image complexity calculator 212 outputs weight data WV based on the image data RGB, the data enable signal En, the vertical sync signal Vsync, and the horizontal sync signal Hsync.

The image complexity is determined based on the pattern of the image data RGB. In detail, the image complexity is determined based on a difference in data value between one pixel PX, which is selected from among the pixels PX, and pixels PX adjacent to the pixel PX. In the case of a relatively great difference in data value (e.g., a difference value greater than a preset reference value), the image data RGB is determined as having a complex pattern and is calculated to be a relatively high value. In the case of a relatively little difference in data value (e.g., a difference value lower than a preset reference value), the image data RGB is determined as having a simple pattern and is calculated to be a relatively low value. The value of the weight data WV is generated based on the degree of the image complexity.

Eyes of a human being are sensitive to a brightness difference (or color difference) rather than absolute brightness (or color). For example, even if the display panel 100 displays images having the same brightness, a user perceives an image having a complex pattern more sensitively than an image having a simple pattern. For example, the user may perceive the image having the complex pattern relatively less darkly than the image having the simple pattern. Accordingly, the image complexity calculator 212 outputs a relatively high weight data WV with respect to the image data RGB having the complex pattern such that a brightness reduction ratio increases, and outputs relatively low weight data WV with respect to the image data RGB having the simple pattern such that a brightness reduction ratio increases. The details of a process of calculating the image complexity will be more fully described later.

The weight calculator 213 receives the brightness data Yavg from the brightness calculator 211 and receives the weight data WV from the image complexity calculator 212. The weight calculator 213 generates brightness correction data dy based on the brightness data Yavg and the weight data WV. The weight calculator 213 generates the brightness correction data dy by referring to the LUT 214 which is to be described later.

According to an exemplary embodiment, the weight calculator 213 generates comparison data by performing an operation for the brightness data Yavg and the weight data WV. The weight calculator 213 refers to a result value stored in the LUT 214 corresponding to the comparison data. The LUT 214 stores information on the result value corresponding to the comparison data. The weight calculator 213 may output the result value as the brightness correction data dy. For example, the weight calculator 213 may generate the comparison data by multiplying the brightness data Yavg and the weight data WV. The weight calculator 213 may include a buffer that is used to synchronize the receive timing of the brightness data Yavg and the receive timing of the weight data WV with each other.

According to another embodiment, the weight calculator 213 receives the brightness data Yavg, and refers to the result value stored in the LUT 214 corresponding to the brightness data Yavg. The LUT 214 stores information on the result value corresponding to the brightness data Yavg. The weight calculator 213 may generate the brightness correction data dy by performing an operation for the result value and the weight data WV. For example, the weight calculator 213 may generate the brightness correction data dy by multiplying the result value and the weight data WV. The weight calculator 213 may include a buffer that is used to synchronize the receiving timing of the brightness data and the receive timing of the weight data WV with each other.

The weight calculator 213 may receive the low-power mode command CMD_ms from the application processor 13 of FIG. 1. When the weight value calculator 213 receives the low-power mode CMD_ms, the weight calculator 213 may generate the brightness correction data dy based on the brightness data Yavg and the weight data WV. The low-power mode command CMD_ms may be a signal provided to the display driver IC 200 from the application processor 13 such that the display driver IC 200 operates in a low-power mode based on the interface with the user. For example, the weight calculator 213 may perform an operation for brightness reduction in the low-power mode. The display driver IC 200 may operate in the low-power mode and a general mode. When the display driver IC 200 operates in the general mode, the weight calculator 213 may not output the brightness correction data dy.

The LUT 214 may include a memory that stores the result value corresponding to data provided from the weight calculator 213. The result value may be preset in the LUT 214. As described above, the data referred to by the weight calculator 213 may be the comparison data resulting from the operation for the brightness data Yavg and the weight data WV or may be the brightness data Yavg. The weight calculator 213 generates the brightness correction data dy by referring to the result value stored in the LUT 214.

The result value stored in the LUT 214 may linearly increase or decrease according to the magnitude of a comparison data value. In addition, the LUT 214 may have the same result value when the comparison data value is less than a specific reference value, or may have an increased result value when the comparison data value is greater than the specific reference value. The result value stored in the LUT 214 may be determined based on the degree of brightness perceived by the user and the image complexity.

The output data calculator 215 receives the brightness correction data dy from the weight calculator 213. The output data calculator 215 may separately receive the image data RGB. The output data calculator 215 transforms the image data RGB into the corrected image data RGB' based on the brightness correction data dy. The output data calculator 215 may generate the corrected image data RGB' by remapping of the brightness correction data dy and the image data RGB.

In the case of high image complexity, the corrected image data RGB' has a data value less than that of the image data RGB. That is, the corrected image data RGB' has a brightness value lower than that of the image data RGB. The difference in data value between image data RGB having a simple pattern with relatively low image complexity and corrected image data RGB' based on the image data RGB is less than the difference in data value between image data RGB having a complex pattern and corrected image data RGB' based on the image data RGB. In addition, the image data RGB having the simple pattern and the corrected image data RGB' may has no difference in data value therebetween. The output data calculator 215 provides the corrected image data RGB' to the source IC 220. Since an image displayed by the display panel 100 based on the corrected image data RGB' has a brightness value lower than that of the image data RGB, the power consumption of the display driving system 1000 may be reduced.

Figure 5:
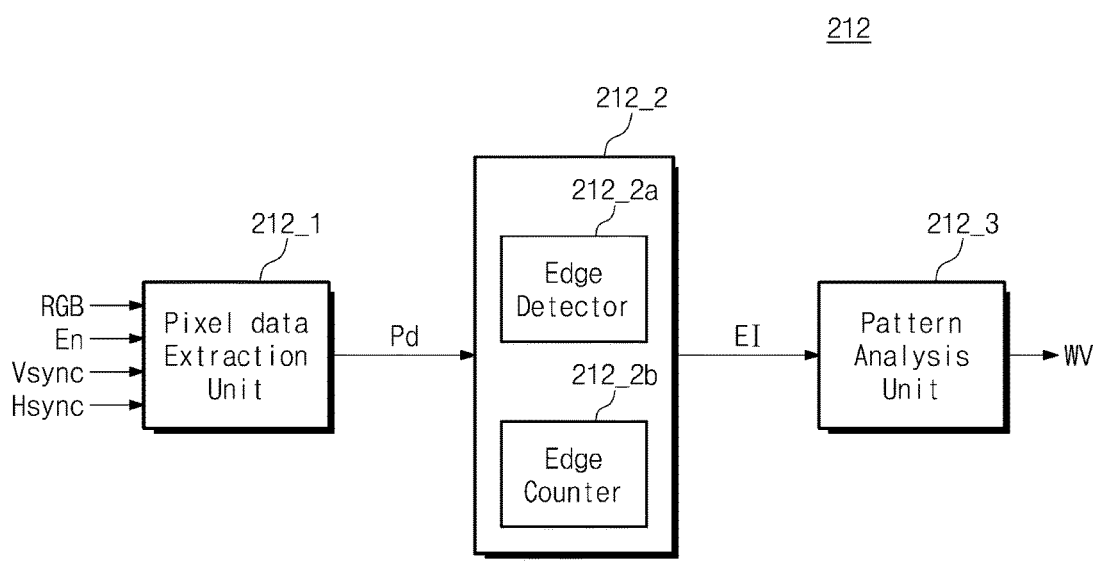
FIG. 5 is a block diagram illustrating an image complexity calculator, according to an exemplary embodiment.

FIG. 5 is a block diagram illustrating the image complexity calculator 212, according to an exemplary embodiment.

Referring to FIG. 5, the image complexity calculator 212 includes a pixel data extraction unit 212_1 (e.g., a pixel data extraction circuit), an edge data calculator 212_2, and a pattern analysis unit 212_3 (e.g., a pattern analysis circuit).

The pixel data extraction unit 212_1 extracts reference pixel data Pd by receiving the image data RGB. The reference pixel data Pd may be image data corresponding to pixels defined to detect the image pattern. The reference pixel data Pd includes target pixel data and edge pixel data adjacent to the target pixel data. The target pixel data is image data corresponding to a target pixel. The edge pixel data may be image data corresponding to edge pixels adjacent to the target pixel. For example, the reference pixel data Pd may be image data corresponding to 3×3 pixels including the target pixels and pixels adjacent to the target pixels in transverse, longitudinal, and diagonal directions from the target pixel. However, the embodiment is not limited thereto. For example, the reference pixel data Pd may be image data corresponding to various numbers of pixels, e.g., 2×2 pixels, 4×4 pixels, 5×5 pixels, etc. The pixel data extraction unit 212_1 may receive the vertical sync signal Vsync, the horizontal sync signal Hsync, and the data enable signal En such that the pixel data extraction unit 212_1 exactly extracts the reference pixel data Pd. The pixel data extraction unit 212_1 extracts edge pixel data adjacent to the target pixel data based on the image data RGB, the data enable signal En, the vertical sync signal Vsync, and the horizontal sync signal Hsync.

The edge data calculator 212_2 receives the reference pixel data Pd from the pixel data extraction unit 212_1. The edge data calculator 212_2 generates edge data EI based on the reference pixel data Pd. The edge data calculator 212_2 includes an edge detector 212_2a (e.g., an edge detecting circuit) and an edge counter 212_2b (e.g., an edge counting circuit).

The edge detector 212_2a detects the edge pixel data from the reference pixel data Pd. The edge detector 212_2a may output the difference in data value between the edge pixel data and the target pixel data. In addition, the edge detector 212_2a may output information on the distance and direction between the target pixel and each edge pixel. For example, the target pixel may be adjacent to the edge pixel in the transverse, longitudinal, or diagonal direction. In addition, the target pixel and any one of the edge pixels may interpose another edge pixel of the edge pixels therebetween. The edge detector 212_2a may detect the difference in data value, and the information on the distance and direction between the target pixel and each edge pixel since the image complexity is varied depending on the distance, the direction, and the brightness difference between the target pixel and the edge pixel.

The edge counter 212_2b counts the number of the edge pixels. The number of the edge pixels may be varied depending on the position of the target pixel. For example, the number of edge pixels among pixels provided in an edge area of the display panel 100 may be smaller than the number of edge pixels provided in the central area of the display panel 100. For example, when the reference pixel data Pd is an image data corresponding to 3×3 pixels including the target pixels and pixels adjacent to the target pixels in transverse, longitudinal, and diagonal directions from the target pixel, the edge counter 212_2b may output a count value of eight (8) as the number of the edge pixels (e.g., PX1, PX2, PX3, PX4, PX6, PX7, PX8, and PX9 as illustrated in FIG. 6) adjacent to the central target pixel (e.g., PX5 as illustrated in FIG. 6); a count value of five (5) as the number of edge pixels adjacent to each of the middle target pixel (e.g., any one of PX2, PX4, PX6, or PX8 as illustrated in FIG. 6) other than the central pixel (PX5); and a count value of three (3) as the number of edge pixels adjacent to each of the corner target pixel (e.g., any one of PX1, PX3, PX7, and PX9). When the image complexity is analyzed by using information on the differential value between the edge pixel data and the target pixel data, the edge counter 212_2b prevents the weight data WV from being erroneously calculated due to the variation in the number of edge pixels.

The edge data EI may include information on the difference in data value between the edge pixel data and the target pixel data, information on the distance and direction between the target pixel and each of edge pixels, and information on the number of the edge pixels. For example, the edge data EI may include values obtained by extracting the information on the distance and direction between the target pixel data and each edge pixel data as the edge pixel data is detected along the transverse, longitudinal, or diagonal direction. In addition, the edge data EI may include various additional information (e.g., information on shape of the edge pixels) which influences the image complexity. Accordingly, the final edge data including edge data corresponding to a plurality of edge pixels may be acquired based on the above information.

For the edge data EI, edge pixel data adjacent to the target pixel data may be detected by moving the target pixel data. The target pixel data may be moved in the transverse direction or the longitudinal direction, and the final edge data may be acquired by detecting the edge data EI for the whole pixels.

The pattern analysis unit 212_3 receives the edge data EI from the edge data calculator 212_2. The pattern analysis unit 212_3 analyzes an image pattern based on the edge data EI. The pattern analysis unit 212_3 generates the weight data WV based on the analyzed image pattern. The weight data WV may be an arithmetic mean value of data obtained by reflecting position-based weights in the target pixel data and the edge pixel data.

According to the pattern analysis result, in the case of the high image complexity, the weight data WV becomes a high value. In the case of lower image complexity, the weight data WV becomes a lower value. As the difference in data value between the target pixel data and the edge pixel data is increased, the image complexity is increased. As the distance between the target pixel and the edge pixel is increased, the influence exerted on the image complexity by the distance is reduced. In addition, the number of the edge pixels is taken into consideration when calculating the image complexity.

Although the description of the image complexity calculator 212 of FIG. 5 has been made in that the configurations, which extracts the reference pixel data Pd, generates the edge data EI, and analyzes the image pattern, are divided into individual blocks, the embodiment is not limited thereto. For example, the image complexity calculator 212 may be implemented in the form of an integrated circuit. The image complexity calculator 212 may extract the reference pixel data Pd while generating the edge data EI or may detect edge pixel data while analyzing an image pattern. In addition, various algorithms and various processes may be used to output the weight data WV based on the image complexity.

FIGS. 6 and 7 are drawings illustrating the detection of edge pixel data of the image complexity calculator 212 of FIG. 5. As illustrated in FIGS. 6 and 7, a first direction DR1 represents a forward direction of the gate lines G1 to Gn. The first direction DR1 may be a row direction. A second direction DR2 represents a direction perpendicular to the first direction DR1, that is, a forward direction of the data lines D1 to Dm. The second direction DR2 may be a column direction. A third direction DR3 crosses both of the first direction DR1 and the second direction DR2 while representing a diagonal direction of a pixel.

Referring to FIG. 6, first to ninth pixels PX1 to PX9 are 3×3 pixels defined to detect the image pattern. Image data corresponding to the first to ninth pixels PX1 to PX9 may be the reference pixel data Pd. Each of the first to ninth pixels PX1 to PX9 may include a red pixel R1, a first green pixel G1, a second green pixel G2, and a blue pixel B1. The first to ninth pixels PX1 to PX9 have brightness data corresponding to a mean value of image data corresponding to the red pixel R1, the first green pixel G1, the second green pixel G2, and the blue pixel B1. The first pixel PX1, the third pixel PX3, the fifth pixel PX5, the seventh pixel PX7, and the ninth pixel PX9 have data values of zeros (0s) corresponding to the lowest brightness value on an 8-bit basis. The second pixel PX2, the fourth pixel PX4, the sixth pixel PX6, and the eighth pixel PX8 have data values of 255 s corresponding to the highest brightness value on the 8-bit basis.

The pixel data extraction unit 212_1 of FIG. 5 extracts pixel data, which corresponds to the first to ninth pixels PX1 to PX9, as the reference pixel data Pd. In this exemplary embodiment, the first pixel PX1 is assumed as the target pixel, and the second to ninth pixels PX2 to PX9 are assumed as edge pixels. The edge data calculator 212_2 calculates the edge data EI of the first to ninth pixels PX1 to PX9 in the first direction DR1. For example, the first pixel PX1 has a great difference in data value from the second pixel PX2 adjacent to the first pixel PX1 because the first pixel PX1 has a data value of zero (0) corresponding to the lowest brightness value on an 8-bit basis and the second pixel PX2 has a data values of 255 corresponding to the highest brightness value on the 8-bit basis. Therefore, the first pixel PX1 has a high image complexity in the first direction DR1. Next, the edge data calculator 212_2 calculates the edge data EI on the first to ninth pixels PX1 to PX9 in the second direction DR2. For example, the first pixel PX1 has a great difference in data value from the fourth pixel PX4 adjacent to the first pixel PX1 because the first pixel PX1 has a data value of zero (0) corresponding to the lowest brightness value on an 8-bit basis and the fourth pixel PX4 has a data values of 255 corresponding to the highest brightness value on the 8-bit basis. Therefore, the first pixel PX1 has a high image complexity in the second direction DR2. Subsequently, the edge data calculator 212_2 calculates edge data EI of the first to ninth pixels PX1 to PX9 in the third direction DR3. For example, the first pixel PX1 has no difference in data value from the fifth pixel PX5 because the first pixel PX1 has a data value of zero (0) corresponding to the lowest brightness value on an 8-bit basis and the fifth pixel PX5 has a data values of zero (0) corresponding to the highest brightness value on the 8-bit basis. Therefore, the first pixel PX1 has a low image complexity in the third direction DR2. The pattern analysis unit 212_3 generates the weight data WV based on the edge data in the first to third directions DR1 to D3. In the pattern illustrated in FIG. 6, which has repeated image data of '0' or '255', since a greater difference in data value exits between image data corresponding to adjacent cells, the weight data WV is calculated to be a high value.

Referring to FIG. 7, the first to third pixels PX1 to PX3, the fourth to sixth pixels PX4 to PX6, and the seventh to ninth pixels PX7 to PX9 are 3×1 pixels defined to detect an image pattern. Image data corresponding to the the first to third pixels PX1 to PX3, the fourth to sixth pixels PX4 to PX6, and the seventh to ninth pixels PX7 to PX9 may be reference pixel data Pd.

The pixel data extraction unit 212_1 extracts three pieces of pixel data, which serves as the reference pixel data Pd, in the third direction DR1, different from that of FIG. 6. For example, although the pixel data extraction unit 212_1 of FIG. 6 simultaneously provides image data corresponding to the first to ninth pixels PX1 to PX9 to the edge data calculator 212_2, the pixel data extraction unit 212_1 of FIG. 7 provides image data corresponding to the first to ninth pixels PX1 to PX9, which are divided into three parts, to the edge data calculator 212_2 three times. The calculation of the image complexity in the first to third directions DR1 to DR3 is required to exactly analyze an image pattern. For example, when the edge data EI of the first to third pixels PX1 to PX3 in the first direction DR1 is calculated, the data values of the first to third pixels PX1 to PX3 are all zeros (0s). Therefore, the first to third pixels PX1 to PX3 represent a simple pattern. However, when the edge data EI is calculated in the second direction DR2 or the third direction DR3, the difference in data value is 255, which represents high image complexity.

The edge data calculator 212_2 may include a memory to store image data corresponding to the first to third pixels PX1 to PX3 and image data corresponding to the fourth to sixth pixels PX4 to PX6 while receiving the seventh to ninth pixels PX7 and PX9. The image complexity may be analyzed in the first to third directions DR1 to DR3. Although FIGS. 6 and 7 illustrate that the image complexity is analyzed in the first to third directions DR1 to DR3, the embodiment is not limited thereto. For example, the edge data calculator 212_2 may additionally analyze the image complexity in a fourth direction perpendicular to the third direction DR3.

Figure 8:
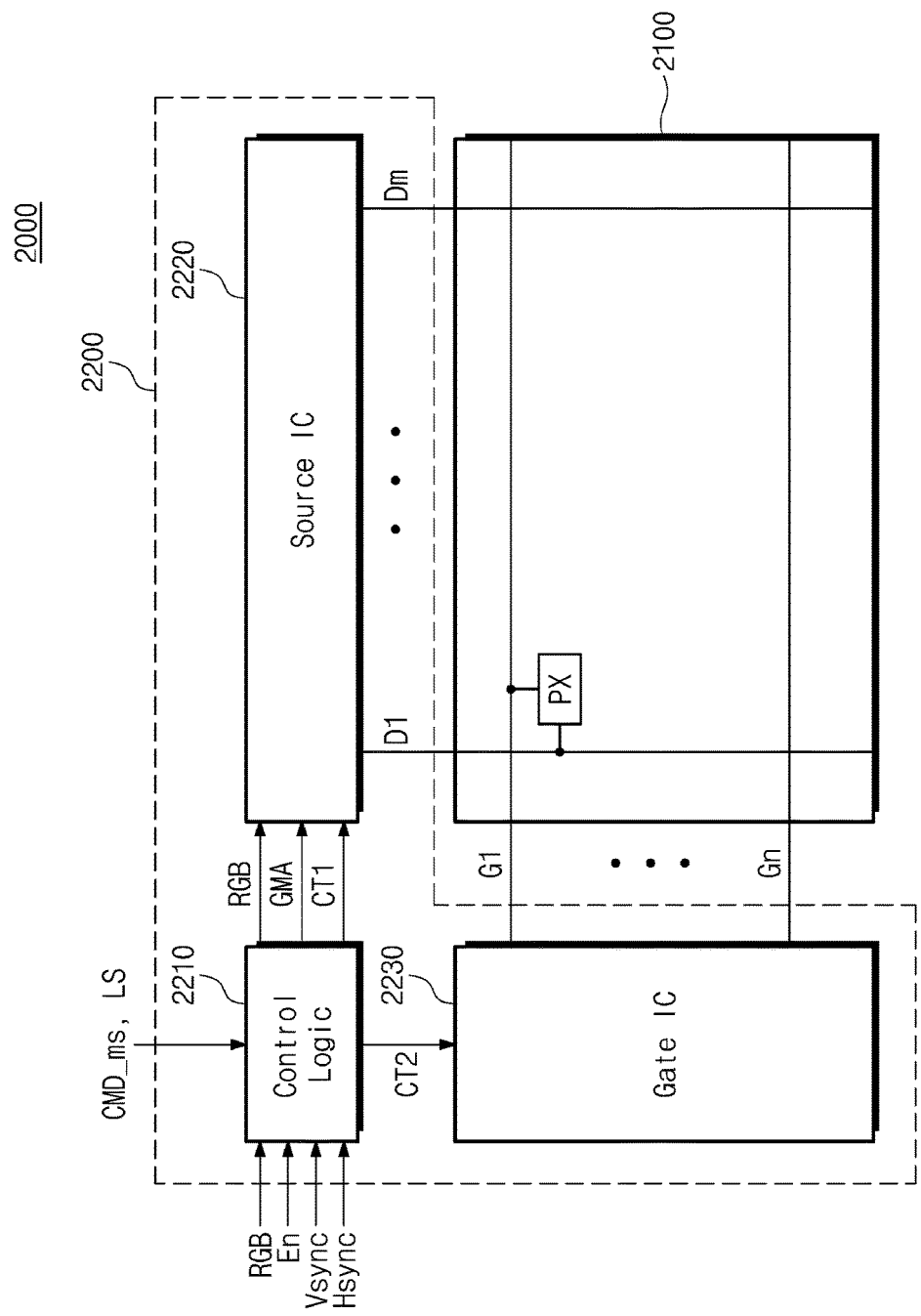
FIG. 8 is a block diagram illustrating a display panel and a display driver integrated circuit, according to another exemplary embodiment.

FIG. 8 is a block diagram illustrating a display 2000, according to another exemplary embodiment.

Referring to FIG. 8, the display 2000 includes a display panel 2100 and a display driver IC 2200. The display driver IC 2200 may include control logic 2210, a source IC 2220, and a gate IC 2230. The display panel 2100 and the gate IC 2230 have the substantially same configurations as those of the display panel 100 and the gate IC 230 of FIG. 3 and perform the substantially same functions as those of the display panel 100 and the gate IC 230 of FIG. 3. Accordingly, the details of the display panel 2100 and the gate IC 2230 will be omitted herein.

The control logic 2210 receives the image data RGB, the vertical sync signal Vsync, the horizontal sync signal Hsyn, and the data enable signal En from the application processor 13 of FIG. 1. In addition, the control logic 2210 may receive the low-power mode command CMD_ms from the application processor 13. The display driver IC 2200 may operate in the low-power mode.

The control logic 2210 may receive the illuminance information LS from the application processor 13. The illuminance information LS may be created based on the light sense signal generated as the light sensor 14 of FIG. 1 senses external light. Based on the illuminance information LS, the control logic 2210 may adjust the brightness value of an image to a lower value under a dark environment having a relatively low illuminance value, and may adjust a brightness value of the image to a high value under a bright environment having a relatively high illuminance value.

The control logic 2210 includes (e.g., outputs) a first control signal CT1 for controlling the operation of the source IC 2220, a second control signal CT2 for controlling the operation of the gate IC 2230, the image data RGB, and a gamma control signal GMA. According to an exemplary embodiment of the FIG. 8, the control logic 2210 controls a gamma voltage and thus reduces the power consumption in image display, different from that of the control logic 210 of FIG. 3. In other words, the control logic 210 of FIG. 3 reduces power consumption by decreasing the data value of the image data RGB corresponding to a complex pattern, while the control logic 2210 of FIG. 8 provides the gamma control signal GMA and thus reduces the gamma voltage corresponding to a complex pattern without the change in the value of the image data RGB. The details of the generation of the gamma control signal GMA will be described below.

The source IC 2220 outputs a data voltage to the data lines D1 to Dm based on the first control signal CT1, the image data RGB, and the gamma control signal GMA. The source IC 2220 determines the gamma voltage corresponding to the data lines D1 to Dm based on the gamma control signal GMA, and determines a grayscale value of the data voltage corresponding to the data lines D1 to Dm based on the determined gamma voltage. For example, the source IC 2220 may include a plurality of resistors connected with each other in series between a power supply (not shown) and a ground terminal, and the gamma voltage may be generated by dividing an operating voltage, which is supplied from the power supply, by resistances of the resistors. The gamma control signal GMA may be provided to a control terminal of a device to select a specific portion of the divided voltage as the gamma voltage.

Although FIG. 8 illustrates that the source IC 2220 determines the gamma voltage, the embodiment is not limited thereto. For example, according to an alternative embodiment, the display driver IC 2220 may separately include a gamma IC which receives the operating voltage from the power supply (not shown) and provides the gamma voltage to the source IC 2220. The gamma control signal GMA may be provided to the gamma IC.

Figure 9:
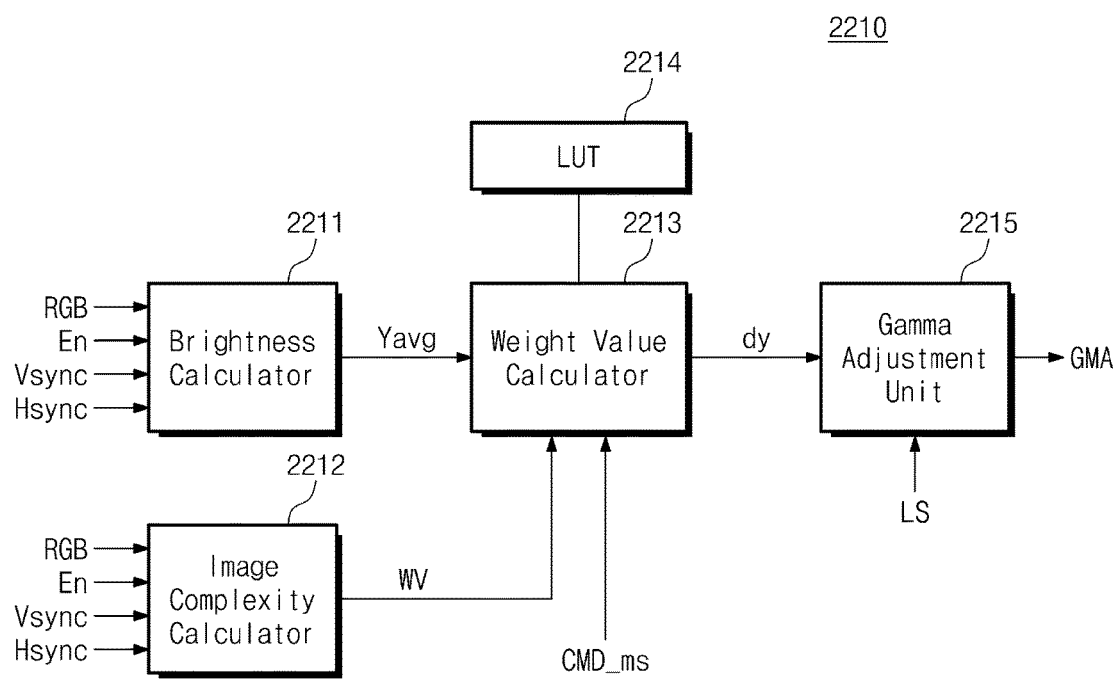
FIG. 9 is a block diagram illustrating control logic, according to another exemplary embodiment.

FIG. 9 is a block diagram illustrating control logic 2210, according to another exemplary embodiment.

Referring to FIG. 9, the control logic 2210 includes a brightness calculator 2211, an image complexity calculator 2212, a weight calculator 2213, an LUT 2214, and a gamma adjusting unit 2215 (e.g., a gamma adjusting unit). The brightness calculator 2211, the image complexity calculator 2212, the weight calculator 2213, and the LUT 2214 have the substantially same configurations as those of the brightness calculator 211, the image complexity calculator 212, the weight calculator 213, and the LUT 214 of FIG. 4 and perform the substantially same functions as those of the brightness calculator 211, the image complexity calculator 212, the weight calculator 213, and the LUT 214 of FIG. 4.

The gamma adjustment unit 2215 receives brightness correction data dy from the weight calculator 2213. The gamma adjustment unit 2215 generates a gamma control signal GMA based on the brightness correction data dy. According to the analysis result of the image data RGB, when the image data RGB has relatively high image complexity, the gamma adjustment unit 2215 generates a gamma control signal GMA for significantly reducing a gamma voltage level corresponding to image data having a complex pattern. According to the analysis result of the image data RGB, when the image data RGB has low image complexity, the gamma adjustment unit 2215 generates a gamma control signal GMA for slightly reducing a gamma voltage level corresponding to image data having a simple pattern or preventing the gamma voltage level from being changed. Based on the gamma control signal GMA, a grayscale value of a data voltage is reduced, and the brightness of an image displayed by the display panel 2100 is reduced. Therefore, the power consumption of the display 2000 may be reduced.

The gamma adjustment unit 2215 may receive illuminance information LS from the application processor 13 of FIG. 1. The gamma adjustment unit 2215 generates a gamma control signal GMA based on the illuminance information LS and the brightness correction data dy. The gamma adjustment unit 2215 may provide a gamma control signal for additionally reducing the brightness of an image when an external environment is analyzed as being dark based on the illuminance information LS (e.g., when an illuminance value LS is about 30 lux to about 300 lux or less than 30 lux). The gamma adjustment unit 2215 may provide a gamma control signal GMA for preventing brightness reduction from being applied even if high image complexity is represented when the external environment is remarkably bright (e.g., when an illuminance value LS is about 500 lux to about 10000 lux or more than 10000 lux).

In some embodiments, a display driving method may include: calculating brightness of image data and generating brightness data; calculating image complexity of the image data based on a pattern of the image data and generating weight data based on the image complexity; receiving the brightness data and the weight data; generating brightness correction data based on the received brightness data and the weight data; generating a data voltage corresponding to the image data based on the brightness correction data; and decreasing the data voltage as the image complexity increases. The image data may comprise target pixel data of a target pixel and edge pixel data of an edge pixel adjacent to the target pixel, and the image complexity may be determined based on a difference in data value between the target pixel and the edge pixel. When the difference in data value between the target pixel and the edge pixel is larger than a preset data value, the image data is determined to be a complex pattern and is calculated to be a high value, when the difference in data value between the target pixel and the edge pixel is smaller than a preset data value, the image data is determined to be a simple pattern and is calculated to be a low value, and the step of generating weight data may include generating the weight data based on a degree of the image complexity.

In some embodiments, the method may further include generating comparison data by multiplying the brightness data and the weight data. In addition, the method may further include providing a look up table to store a result value resulting from the brightness data or the weight data, wherein the step of generating brightness correction data may include generating comparison data by multiplying the brightness data and the weight data, and transforming the comparison data into the brightness correction data in accordance with the result value stored in the look up table.

In some embodiments, the method may further include: generating a gamma control signal based on the brightness correction data; generating a gamma voltage in response to the gamma control signal; and generating the data voltage based on the gamma voltage, and wherein the gamma voltage decreases as the image complexity increases. In some embodiments, the method may further include receiving illuminance information based on an external illuminance value and outputting the gamma control signal based on the brightness correction data and the illuminance information.

As described above, according to an exemplary embodiment, the pattern complexity is analyzed and the brightness of the image is reduced, thereby reducing the power consumption in the display driving system.

Although the exemplary embodiments of the present disclosure have been described, it is understood that the present disclosure should not be limited to these exemplary embodiments but various changes and modifications can be made by one ordinary skilled in the art within the spirit and scope of the present invention as hereinafter claimed.

What is claimed is:

1. An organic light emitting display driver integrated circuit comprising:
    a brightness calculating circuit configured to calculate brightness of image data and to generate brightness data;
    an image complexity calculating circuit configured to calculate image complexity based on a pattern of the image data and to generate weight data based on the image complexity;
    a weight calculating circuit configured to receive the brightness data and the weight data and to generate brightness correction data based on the brightness data and the weight data; and
    a source integrated circuit configured to generate a data voltage corresponding to the image data, based on the brightness correction data,
    wherein the source integrated circuit decreases the data voltage provided to an organic light emitting panel as the image complexity increases,
    wherein the image complexity calculating circuit comprises:
    a pixel data extraction circuit configured to extract reference pixel data, which comprises target pixel data of a target pixel and edge pixel data of an edge pixel located adjacent to the target pixel, from the image data;
    an edge data calculating circuit configured to generate edge data comprising information on a difference in data value between the target pixel data and the edge pixel data; and
    a pattern analysis circuit configured to analyze the pattern of the image data and to generate the weight data, based on the edge data, and
    wherein the pixel data extraction circuit is configured to:
    receive a vertical synchronization signal for frame identification and a horizontal synchronization signal for identifying a row of pixels corresponding to the image data, and
    extract a first edge pixel data adjacent to the target pixel data in a row direction from the target pixel data and a second edge pixel data adjacent to the target pixel data in a column direction, which is perpendicular to the row direction, from the target pixel data based on the vertical and horizontal synchronization signals.

2. The organic light emitting display driver integrated circuit of claim 1, further comprising:
    a gamma adjustment circuit configured to generate a gamma control signal based on the brightness correction data.

3. The organic light emitting display driver integrated circuit of claim 2,
    wherein the source integrated circuit generates a gamma voltage in response to the gamma control signal, and generates the data voltage based on the gamma voltage, and
    wherein the gamma voltage decreases as the image complexity increases.

4. The organic light emitting display driver integrated circuit of claim 3,
    wherein the gamma adjustment circuit receives illuminance information based on an external illuminance value and outputs the gamma control signal based on the brightness correction data and the illuminance information.

5. The organic light emitting display driver integrated circuit of claim 1, further comprising:
    an output data calculating circuit configured to transform the image data into corrected image data based on the brightness correction data, and to provide the corrected image data to the source integrated circuit.

6. The organic light emitting display driver integrated circuit of claim 5,
    wherein a brightness value of the corrected image data is less than a brightness value of the image data.

7. The organic light emitting display driver integrated circuit of claim 1,
    wherein the edge data calculating circuit comprises:
    an edge detecting circuit configured to detect the edge pixel data; and
    an edge counting circuit configured to detect the number of edge pixels.

8. The organic light emitting display driver integrated circuit of claim 1,
    wherein the edge data further comprises:
    information on a distance between the target pixel corresponding to the target pixel data and the edge pixel corresponding to the edge pixel data, and information on a direction between the target pixel and the edge pixel.

9. The organic light emitting display driver integrated circuit of claim 1, further comprising:
    a look up table configured to provide a result value resulting from the brightness data or the weight data to the weight calculating circuit,
    wherein the weight calculating circuit is configured to:
    generate comparison data by multiplying the brightness data and the weight data, and
    transform the comparison data into the brightness correction data in accordance with the result value stored in the look up table.

10. An organic light emitting display driving method, comprising:
    calculating brightness of image data corresponding to each of pixels included in an organic light emitting display panel;
    calculating image complexity of the image data based on a pattern of the image data;
    generating weight data based on the image complexity;
    generating brightness correction data corresponding to each of the pixels based on the brightness of the image data and the weight data;
    generating a data voltage provided to each of the pixels based on the brightness correction data; and
    decreasing the data voltage provided to pixels having an increased image complexity,
    wherein the calculating of image complexity comprises:

extracting reference pixel data including target pixel data of a target pixel and edge pixel data of an edge pixel located adjacent to the target pixel from the image data;

generating edge data having information on a difference in data value between the target pixel data and the edge pixel data; and analyzing the pattern of the image data and to generate the weight data, based on the edge data, and wherein the extracting of the reference pixel data comprises:

receiving a vertical synchronization signal for frame identification and a horizontal synchronization signal for identifying a row of pixels corresponding to the image data, and extracting a first edge pixel data adjacent to the target pixel data in a row direction from the target pixel data and a second edge pixel data adjacent to the target pixel data in a column direction, which is perpendicular to the row direction, from the target pixel data based on the vertical and horizontal synchronization signals.

11. The method of claim 10, further comprising:

generating a gamma control signal based on the brightness correction data;

generating a gamma voltage in response to the gamma control signal; and generating the data voltage based on the gamma voltage, and wherein the gamma voltage decreases as the image complexity increases.

12. The method of claim 11, further comprising:

receiving illuminance information based on an external illuminance value and outputting the gamma control signal based on the brightness correction data and the illuminance information.

13. The method of claim 10, wherein the image complexity is determined based on the difference in data value between the target pixel and the edge pixel.

14. The method of claim 10, further comprising:

providing a look up table to store a result value resulting from brightness data based on the brightness of the image data or the weight data, wherein the step of generating brightness correction data comprises:

generating comparison data by multiplying the brightness data and the weight data, and transforming the comparison data into the brightness correction data in accordance with the result value stored in the look up table.

15. A display driving system comprising:

a display driver integrated circuit configured to generate a data voltage based on image data which comprises target pixel data of a target pixel and edge pixel data of an edge pixel located adjacent to the target pixel; and an organic light emitting display panel comprising a data line, which receives the data voltage, a gate line which crosses the data line, and a pixel connected with the data line and the gate line, wherein the display driver integrated circuit comprises:

a control circuit configured to calculate image complexity based on a difference in data value between the target pixel data and the edge pixel data; and a source integrated circuit configured to generate the data voltage corresponding to the target pixel data based on the image complexity, and wherein the source integrated circuit reduces the data voltage provided to the organic light emitting display panel as the image complexity increases, wherein the control circuit comprises:

a brightness calculating circuit configured to calculate brightness of the image data and to generate brightness data;

an image complexity calculating circuit configured to calculate the image complexity and to generate weight data based on the image complexity;

a weight calculating circuit configured to generate brightness correction data based on the brightness data and the weight data; and an output data calculating circuit configured to receive the brightness correction data and the image data, to transform the image data into corrected image data based on the brightness correction data, and to provide the corrected image data to the source integrated circuit, wherein the image complexity calculating circuit comprises:

a pixel data extraction circuit configured to extract reference pixel data, which comprises the target pixel data of the target pixel and the edge pixel data of the edge pixel located adjacent to the target pixel, from the image data;

an edge data calculating circuit configured to generate edge data comprising information on the difference in data value between the target pixel data and the edge pixel data; and a pattern analysis circuit configured to analyze the pattern of the image data and to generate the weight data, based on the edge data, and wherein the pixel data extraction circuit is configured to:

receive a vertical synchronization signal for frame identification and a horizontal synchronization signal for identifying a row of pixels corresponding to the image data, and extract a first edge pixel data adjacent to the target pixel data in a row direction from the target pixel data and a second edge pixel data adjacent to the target pixel data in a column direction, which is perpendicular to the row direction, from the target pixel data based on the vertical and horizontal synchronization signals.

16. The display driving system of claim 15, further comprising:

an application processing circuit configured to provide a low-power mode command signal to the display driver integrated circuit, wherein the display driver integrated circuit generates the data voltage based on the image complexity when the display driver integrated circuit receives the low-power mode command signal.

17. The display driving system of claim 16, further comprising:

a light sensor configured to sense light and to generate a light sense signal, wherein the application processing circuit is configured to provide illuminance information to the display driver integrated circuit based on the light sense signal, wherein the display driver integrated circuit further comprises:

a gamma adjusting circuit configured to provide a gamma control signal to the source integrated circuit based on the image complexity and the illuminance information, and wherein the source integrated circuit generates a gamma voltage based on the gamma control signal and generates the data voltage based on the gamma voltage.

\* \* \* \* \*